G. WIBERG.
COIN COUNTING AND PACKAGING DEVICE.
APPLICATION FILED MAR. 1, 1911.
1,071,194.
Patented Aug. 26, 1913.
5 SHEETS—SHEET 1.
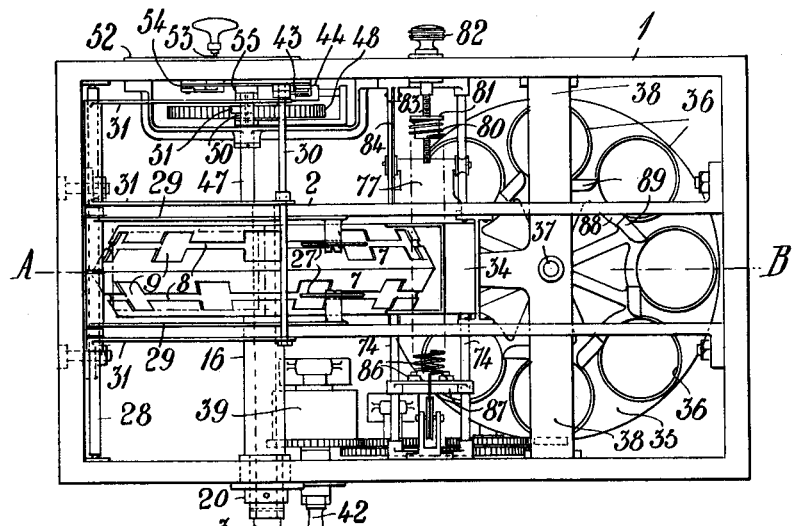
Fig. 1.
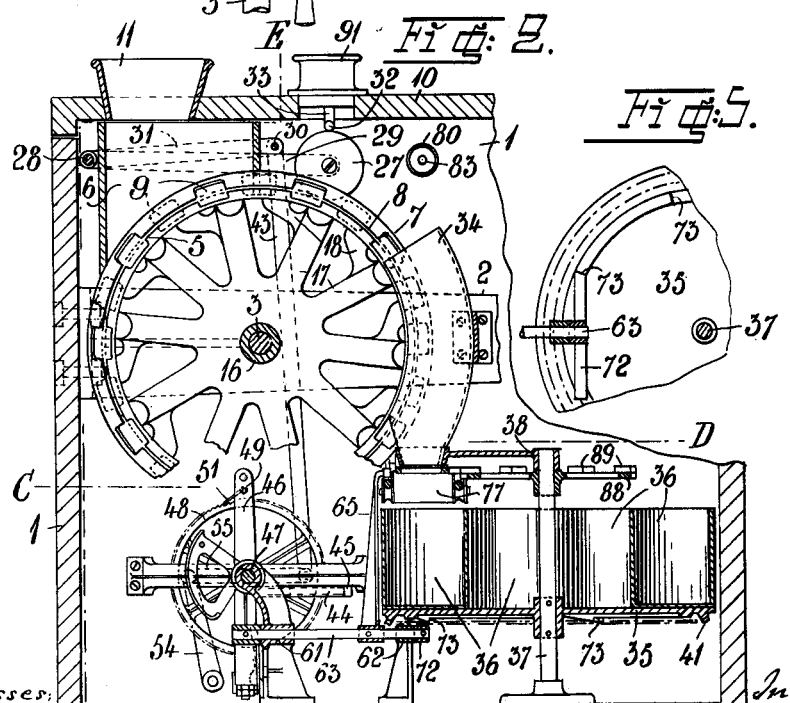
Fig. 2.
Fig. 3.

G. WIBERG.
COIN COUNTING AND PACKAGING DEVICE.
APPLICATION FILED MAR. 1, 1911.
1,071,194.
Patented Aug. 26, 1913.
5 SHEETS—SHEET 2.
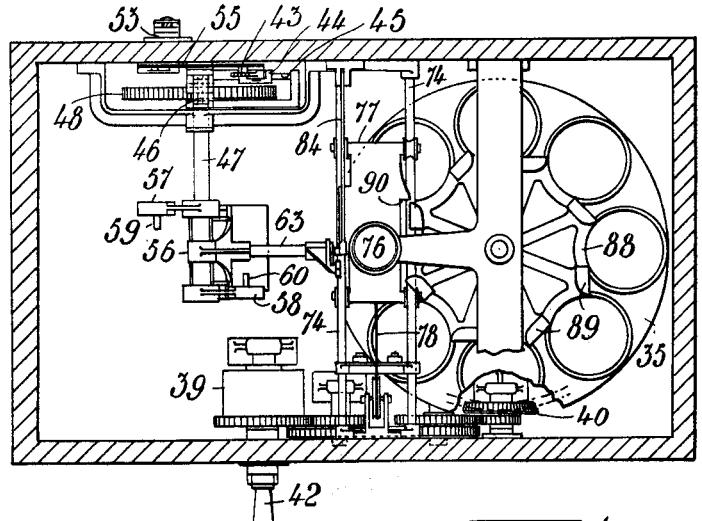
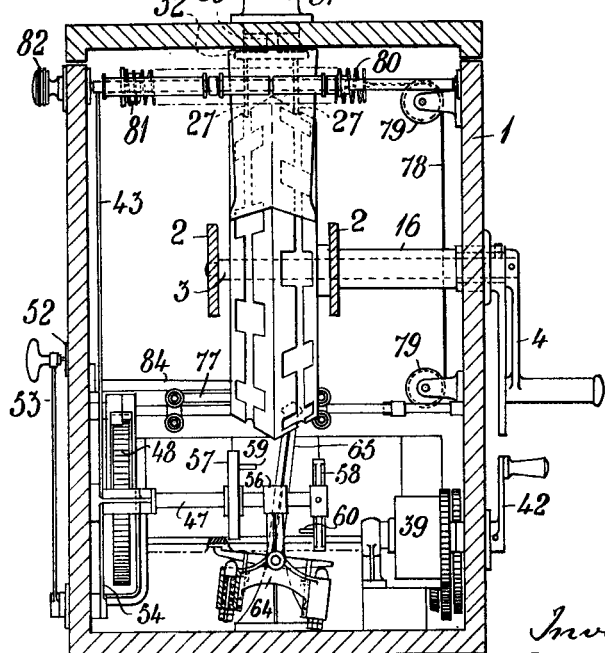
Witnesses:
L. H. Staaden.
Anna Hoyer.
Inventor:
Georg Wiberg

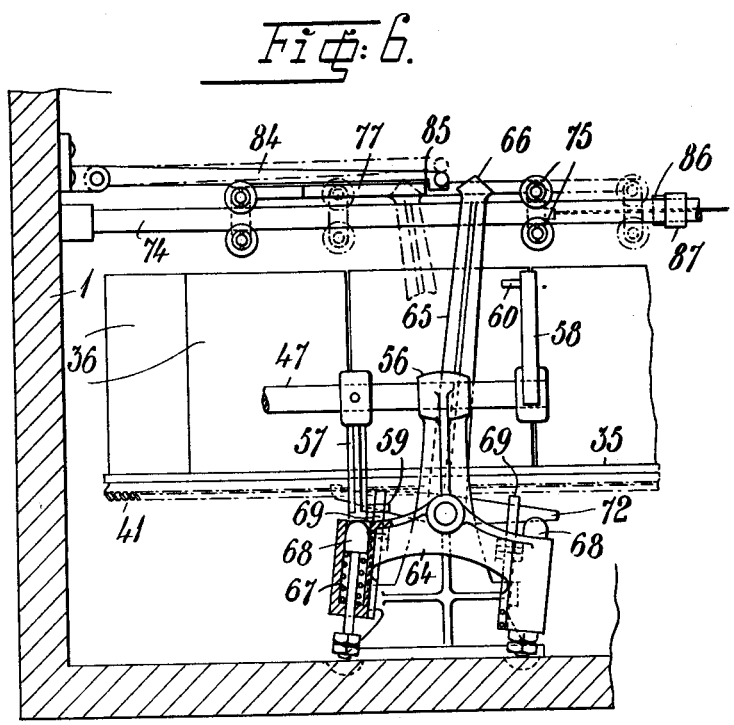
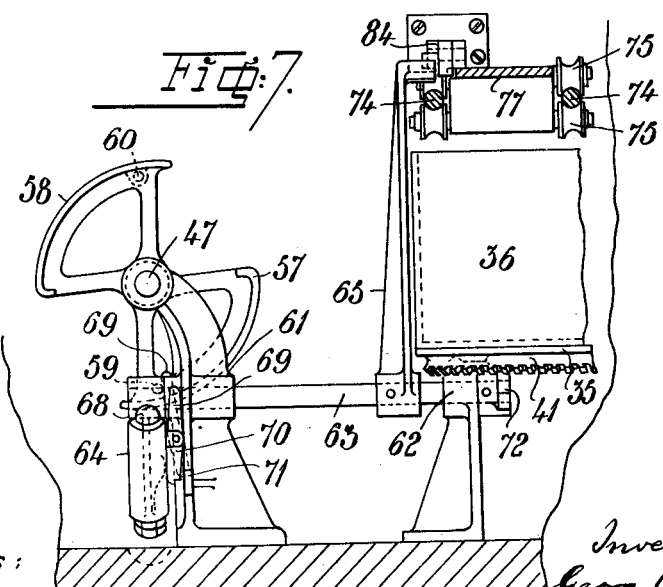

G. WIBERG.
COIN COUNTING AND PACKAGING DEVICE.
APPLICATION FILED MAR. 1, 1911.
1,071,194.
Patented Aug. 26, 1913.
5 SHEETS—SHEET 4.
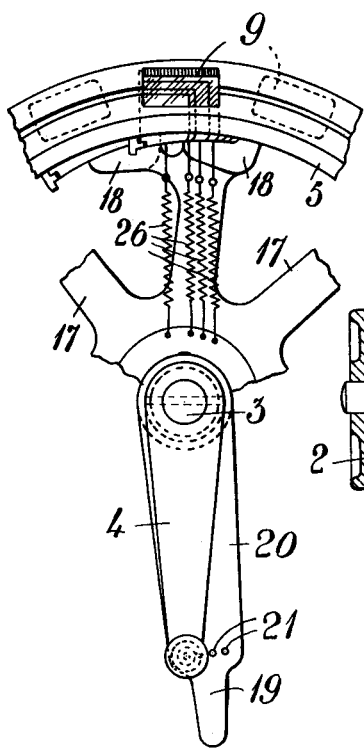
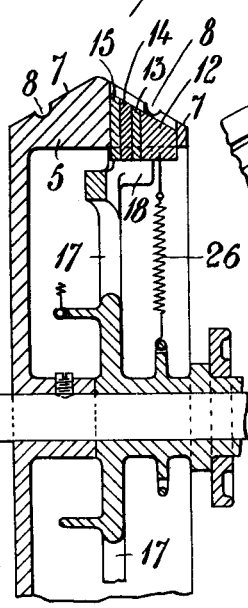
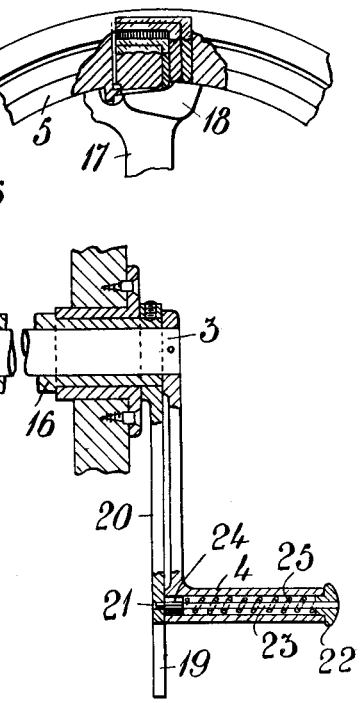
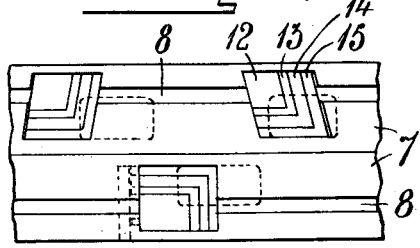
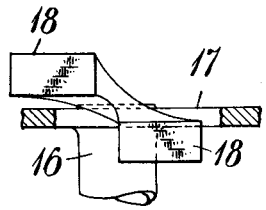

G. WIBERG.
COIN COUNTING AND PACKAGING DEVICE.
APPLICATION FILED MAR. 1, 1911.
1,071,194.
Patented Aug. 26, 1913.
5 SHEETS—SHEET 5.
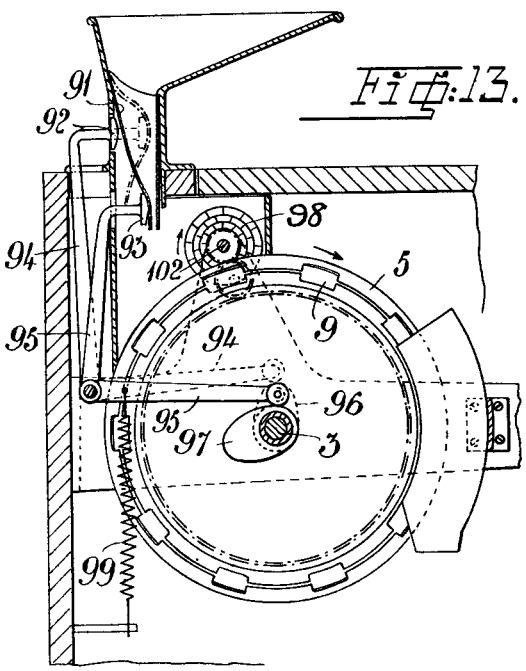
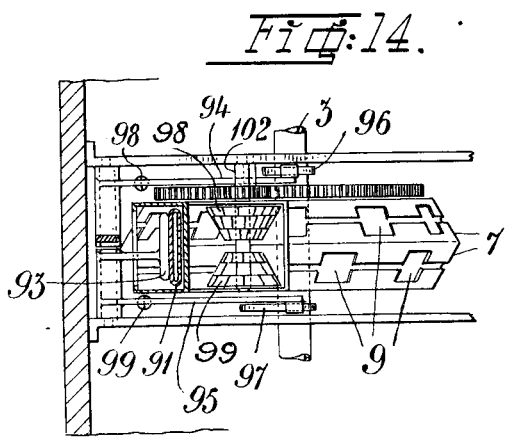

UNITED STATES PATENT OFFICE.

GEORG WIBERG, OF STOCKHOLM, SWEDEN.

COIN COUNTING AND PACKAGING DEVICE.

1,071,194.  Specification of Letters Patent.  Patented Aug. 26, 1913.

Application filed March 1, 1911. Serial No. 611,701.

*To all whom it may concern:*

Be it known that I, GEORG WIBERG, a subject of the King of Sweden, and resident of Strandvägen 57, Stockholm, Sweden, have invented certain new and useful Improvements in Coin Counting and Packaging Devices, of which the following is a specification.

My invention refers to an apparatus for automatically and continuously counting coins or the like and at the same time delivering into lots of any desired predetermined number into cups, bags or other receptacles that are moved forward automatically.
On the accompanying drawing there is shown, as an example only, an apparatus constructed according to my invention, which is capable of counting automatically and continuously coins of four different sizes and gathering them into lots each containing, for instance, 20, 40, 50 or 100 pieces.

Figure 1 represents the apparatus in a plan view with the cover removed. Fig. 2 represents a section on line A—B of Fig. 1 with the cover in place. Fig. 3 represents a section on line C—D of Fig. 2. Fig. 4 represents a section on line E—F of Fig. 2. Fig. 5 represents a detail viewed from below. Figs. 6 to 12 are detail views on a larger scale. Figs. 13 and 14 represent special arrangements seen from the side and from above.

The mechanism of the apparatus is contained in a casing 1 forming the frame for supporting different parts of the mechanism. In said casing, journaled in a beam 2, is mounted a horizontal shaft 3 extending outside the casing, and on one end of the shaft a crank handle 4 or the like is mounted for rotating the shaft by hand or from any other source of power. Inside the casing there is mounted on the shaft 3 a counting disk 5. Above the counting disk 5 is arranged a feeding channel 6 made of a hard material, which ends so close to the counting disk as to open, practically, immediately at its periphery. The said periphery is doubly coned, Fig. 9, and each of the sloping peripheral surfaces 7 is provided with holes 9, Fig. 8, distributed symmetrically around the entire periphery in such a manner that the holes in one of the surfaces 7 are lying zigzag relatively to the holes in the other surface 7. For the feeding channel 6 there is provided a feeding hopper 11 extending through the cover 10 of the casing and connected with a larger receptacle, not shown. The holes 9 extend through the ring of the disk and are rectangular in cross section. In each of them are inserted four loose pieces 12 to 15. The one piece 12 is rectangular in cross section and the three others 13, 14, 15 are of an angular cross section, the pieces 13, 14 and 15 embracing each other and the piece 12, as best seen in the Figs. 8 to 11. These pieces serve the purpose of allowing the holes 9 to be adapted for larger or smaller coins with a view of being able to use the same disk for counting coins of different sizes by adjusting the pieces as set forth below. In Fig. 9 the pieces are shown to be adjusted for the largest kind of coins, *i. e.* the outer surfaces of all the radially directed pieces are somewhat sunk below the peripheral surface 7 and form the bottom of the recesses in which the coins lie during the counting. Supposing the extreme piece 15 to be pushed forward in the hole 9 so that its surface lies flush with the peripheral surface 7, the remaining pieces will then form the bottom of a somewhat smaller recess for coins of the next smaller size. A corresponding adjustment may be made with regard to one or more of the other pieces. By thus adjusting the pieces in the radial direction the width and depth of the recesses may be varied and the counting disk thus be adapted for counting coins of different sizes.

The adjustment of the several pieces is effected by the following device. On the shaft 3 there is arranged a second hollow shaft 16 on which are fixed spokes 17 within the counting disk 5 that is open on one of its flat sides. At their outer ends the spokes 17 are fitted with two cams 18 one for each series of pieces 12 to 15. Those cams have a cam surface (Fig. 12) for each one of the pieces and said cam surfaces are adapted to displace the pieces successively and radially outward and to retain one or more of them—depending on the size of the coin—in the outer position when the shaft 16 and the spokes 17 are turned relatively to the counting disk. The turning of the shaft 16 relatively to the counting disk 5 is effected by means of an arm 20 fixed to the hollow shaft 16 which arm is behind the crank 4 and is provided with a handle 19. In the vicinity of the handle the arm 20 has four holes 21 opposite to the handle of the crank 4, the handle of the crank is hollow and traversed by a rod 23 provided with an outer knob 22 which passes through a stationary abutment 24 at the inner end of the crank handle and is surrounded by a spiral spring 25, under tension, connecting the knob 22 and the abutment 24. Normally the rod is made to enter one of the four holes 21; when, for instance, it is in the extreme left hole, as in Fig. 8, the spokes 17 will be then coupled to the counting disk 5 and the pieces 12 to 15 will occupy the position shown in Fig. 9. If the counting disk is to be adjusted for coins of a smaller size the handle of the crank 4 is held fast, the knob 22 drawn outward so as to cause the rod 23 to leave the hole 21 in which it has been engaged, the arm 20 turned relatively to the crank 4 and the rod 23 is caused to snap into another of the holes 21, say the second from the left in Fig. 8, in which case the angular pieces 15 will be moved so as to be flush with the surfaces 7 and the other pieces 12, 13, 14 will be pushed upward or outward for some distance, the depth of the holes 9 being thereby adapted to the coin to be counted. Each of the pieces 12 to 15 are held against the cams 18 by spiral springs 26 and are prevented by suitable abutments in the disk from being moved out of the holes either inward or outward. Each peripheral surface 7 has a groove 8 and a roller 27 rests in each groove 8. Each of said rollers 27 is mounted on an arm 29 pivoted on a shaft 28. On said arms 29 a rod 30 rests loosely carried by three arms 31 attached to the shaft 28 which is suitably mounted in bearings in the casing. The rollers 27 are located right below a cross piece 32 carried on the lower end of an operating arm 33 of a counting apparatus of known construction which is inclosed in a box 91 on the cover of the casing.

The part of the apparatus hitherto described operates in the following manner: Coins of the kind to be counted, for instance, shillings, are made to enter the hopper 11 carried by the cover 10 and above the feeding channel 6, from a receptacle, not shown, that is placed above the hopper and is charged with shilling-pieces. By means of the crank 4 or other suitable member such as a pulley, the shaft 3, and thereby the counting disk 5, is rotated, the holes 9 in the disk passing the lower mouth of the channel 6 in succession. A coin will then enter each hole 9 as it passes to the mouth. For preventing an excessive wearing of the coins in passing through the supply channel the latter may be arranged so as to distribute the pressure of the mass of coins, for instance, by providing two slides one above the other which are automatically and alternately moved into and out of the channel by means of a suitable connection from the shaft 3 and allow a limited number of coins to fall down each time. Such an arrangement is shown in Figs. 13 and 14 in a view from the side and from above. In the supply channel 6 prolonged upward and formed as a hopper there is attached a hose of suitable material, for instance india rubber the sides of which are alternatively pressed together by two plates 92, 93 each supported by a bell crank lever 94, 95, which are operated by cam disks 96, 97 keyed to the shaft 3. In the same figures there are also shown in the supply channel 6 two conical rolls 98, 99 having such a position relatively to the doubly coned peripheral surface 7 of the counting disk 5 that in the case of some coins sticking together the rolls keep back a coin lying on another and only allow the coin resting in the recess to pass. These rolls are mounted on a common shaft 102 and by means of any suitable gearing from the shaft 3 they are rotated in opposite direction to the disk 5 as indicated by the arrows in Fig. 13. When the counting disk 5 rotates each hole 9 must pass a roller 27. If a hole 9 contains a coin this coin will lift the roller 27 in passing. The roller then actuates the arm 32 of the counting apparatus and the coin is counted. If a hole 9 is empty the roller will not be lifted and the counting apparatus is not operated. As the roller 27 is lifted by a coin lying in a hole 9 as it passes below the roller consequently all the coins passing the roller 27 are counted by the counting apparatus and recorded in it. By the sloping of the peripheral surfaces 7 it is rendered possible for the coins to fall into the holes 9 and to be carried forward in said holes.

For collecting the counted coins a discharge channel 34 is arranged fixed to the beam 2 on the opposite side of the counting disk relatively to the feeding channel 6 and right in front of it. In this channel 34 the coins fall down out of the holes 9 in the rotating disk. Beneath the discharge channel 34 there is provided an intermittently rotated turn-table 35 on the periphery of which a number of loose receptacles 36, or bags for receiving the coins falling down from the channel 34, are placed. The turn-table 35 is keyed on a vertical shaft 37 rotatably mounted in bearings on the bottom of the casing and in a rail 38. By the rotation of the turn-table one receptacle after the other, as they are filled, can be carried away from the channel 34 and an empty receptacle be carried under it. The rotation of the turn-table 35 is effected either by means of a spring device 39, for instance a clock-work and intermediate toothed wheels of which the last one 40 is beveled and gears with a beveled toothed ring 41 on the underside of the turn-table 35. The spring device 39 may be wound up by means of a crank 42.

The discharge channel 34 may extend through the side or bottom of the casing so that the coins falling down through the channel may be discharged outside of the casing, or a collecting device may be placed within the casing below the lower outlet of the discharge channel.

The holes in the periphery of the counting disk may have, of course, any other suitable form than a rectangular one, in which case the loose pieces must be shaped correspondingly. It is evident also that the loose pieces may be dispensed with altogether where the apparatus is intended for counting coins of one size only. Likewise the roller 27 may be dispensed with, and the ends of the pivoted arms 29 may slide in the respective groove 8. In short, the details of the apparatus, as far as arrangement, combination, dimension, number, etc., are concerned may be modified to suit various requirements.

I claim:

1. Apparatus for counting and packaging coins, comprising a rotatable coin carrier in form of a disk provided with a doubly coned periphery and mounted on a horizontal driving shaft and having two series of peripheral recesses each adapted to receive a coin from a feeding channel coöperating herewith and means for counting the coins carried.

2. Apparatus for counting and packaging coins comprising a rotatable coin carrier in form of a disk provided with a doubly coned periphery and mounted on a horizontal driving shaft and having two series of peripheral recesses each adapted to receive a coin from a feeding channel coöperating herewith, a number of movable pieces disposed in said recesses and forming bottoms and side walls thereto, means for moving one or more of said pieces within the recesses to alter the dimensions of the recesses to adapt them to coins of various sizes and thicknesses, and means for counting the coins carried.

3. Apparatus for counting and packaging coins comprising a rotatable coin carrier in form of a disk provided with a doubly coned periphery and mounted on a horizontal driving shaft and having two series of peripheral recesses each adapted to receive a coin from a feeding channel coöperating herewith, and means for counting the coins carried, actuated by the coins to be counted, adjustable means for automatically moving an empty receptacle into position to receive the counted coins and removing it therefrom, when the desired number of coins has been deposited therein, and means for altering at will the number of coins in the receptacle.

In testimony whereof I have signed my name to this specification, in the presence of two subscribing witnesses.

GEORG WIBERG.

Witnesses:
A. HELJESTRAND,
G. ERICSON.

---

Copies of this patent may be obtained for five cents each, by addressing the "Commissioner of Patents, Washington, D. C."